United States Patent
Granqvist

[15] 3,680,964
[45] Aug. 1, 1972

[54] INSTRUMENT FOR COMBINED ANGULAR AND DISTANCE MEASUREMENTS

[72] Inventor: Carl-Erik Granqvist, Lidingo, Sweden

[73] Assignee: AGA Aktiebolag, Lidingo, Sweden

[22] Filed: Sept. 8, 1970

[21] Appl. No.: 70,118

[30] Foreign Application Priority Data

Nov. 27, 1969 Sweden.....................16301/69

[52] U.S. Cl........................................356/141, 356/5
[51] Int. Cl........................G01b 11/26, G01c 3/08
[58] Field of Search....................356/4, 5, 141, 152

[56] References Cited

UNITED STATES PATENTS 3,521,071 7/1970 Speller...........................356/152

FOREIGN PATENTS OR APPLICATIONS 160,266 8/1957 Sweden...........................356/5

Primary Examiner—Benjamin A. Borchelt
Assistant Examiner—S. C. Buczinski
Attorney—Larson, Taylor and Hinds

[57] ABSTRACT

An instrument for measuring distance by transmitting modulated light and receiving reflected light having a phase delay representing the distance. The instrument has an internal delay network for delaying the transmitter signal and a null instrument responsive to the phase difference between the output of the delay network and that of the receiver. An angular measurement, for instance azimuth or elevation, obtained according to the invention is provided by coupling a rotatable member representing the angle to control the delay of a light path, which can be inserted between the transmitter and the receiver.

10 Claims, 3 Drawing Figures

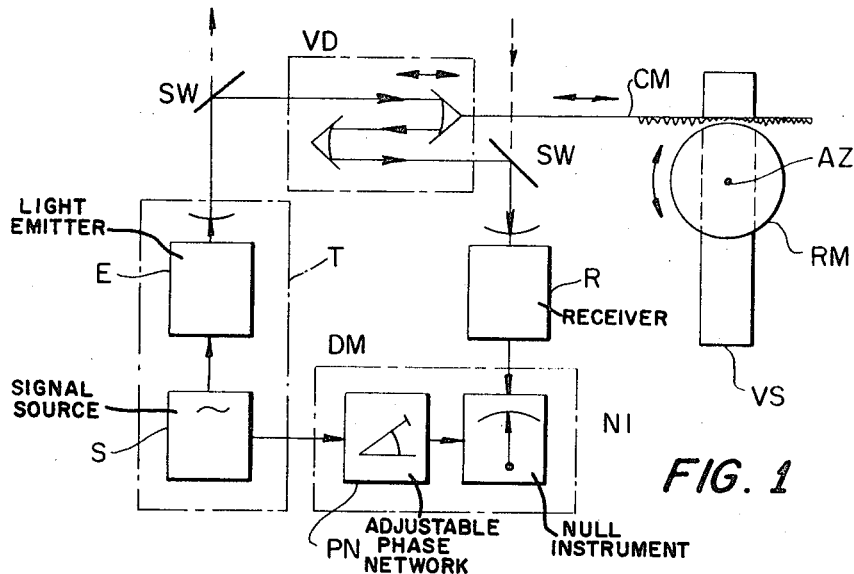
*FIG. 1*
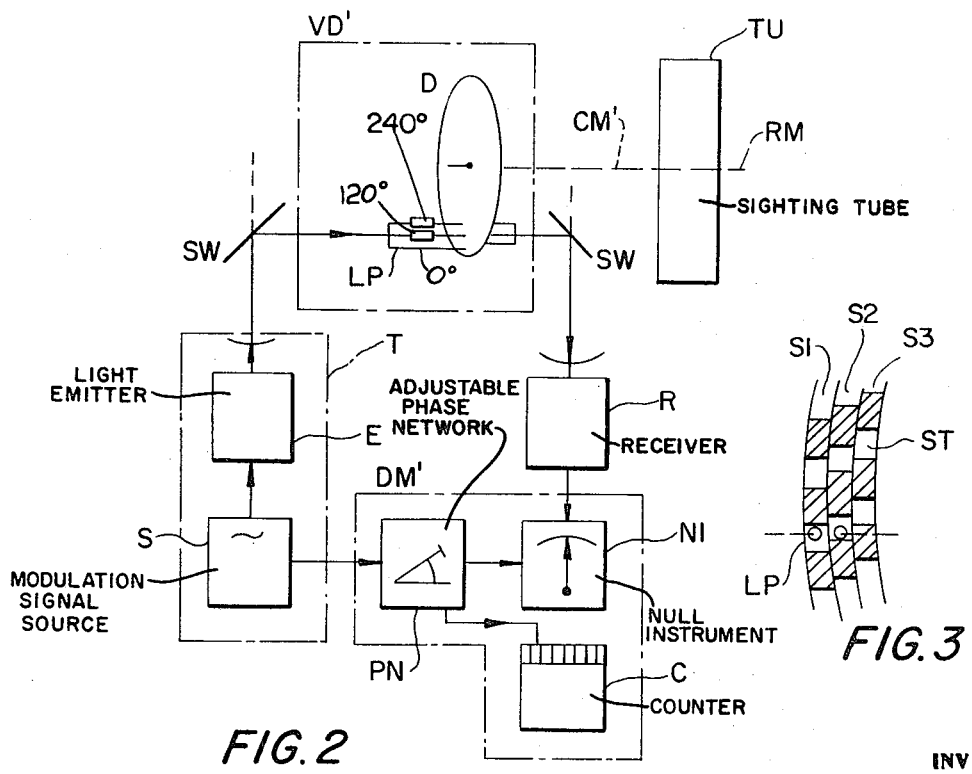
*FIG. 2*
*FIG. 3*
INVENTORS
CARL-ERIK GRANQVIST
BY Larson, Taylor and Hinds
ATTORNEYS

INSTRUMENT FOR COMBINED ANGULAR AND DISTANCE MEASUREMENTS

BACKGROUND OF THE INVENTION

The invention relates to the type of distance-measuring instrument which transmits a signal and receives it after reflection by a distant reflector and measures the delay of the received signal to determine distance. The signal may be a beam of modulated light, and the delay measurement then takes the form of a phase measurement.

In many types of geodetical work it is desired to measure, besides distance, the angular position of a rotatable member of the instrument representing, for instance, azimuth or elevation. To this end, the instruments have been provided conventionally with graduated discs. However, the reading of such measurements is extremely time-consuming and requires the operator to move from one instrument to another, which substantially increases the time required for the measurement.

SUMMARY OF THE INVENTION

The essential feature of the invention is a variable delay device which can be inserted between the transmitter and the receiver and which is coupled to the rotatable member whose angular position is to be measured, whereby the delay of the variable delay device represents the angular position and can be read off on the same instrument used for measuring distance.

THE DRAWING

FIG. 1 shows an embodiment of the invention.
FIG. 2 shows another embodiment, and
FIG. 3 is a detail view of the variable delay device of FIG. 2.

DESCRIPTION OF EMBODIMENTS

The instrument of FIG. 1 comprises a transmitter T, a receiver R and a delay means DM which is responsive to the time difference between the transmitter and the receiver signals for measuring the delay.

Transmitter T comprises a light emitter E having a modulation input which is connected to the output of a modulation signal source S. Emitter E emits a beam of modulated light in the direction of the distance to be measured. The beam is reflected at a distant reflector, not shown in the drawing, and returns to receiver R with a delay of the modulation signal corresponding to the distance to be measured.

Delay means DM comprises an adjustable phase network PN and a null instrument NI. Phase network PN has its input connected to an output of signal source S and its output to one input of null instrument NI. The other input thereof is connected to the output of receiver R.

The instrument also comprises an adjustable delay device VD in the form of a light path of adjustable length. Delay device VD can be inserted in the path of light between transmitter T and receiver R with the aid of switching means SW comprising a pair of mirrors which may be inserted for deflecting the path of the light beam, as shown. Coupling means CM are provided between delay device VD and a rotatable member RM coupled with the azimuth axle AZ of a viewing system VS. Viewing system VS may be an optical system having its axis parallel to the direction of the emitted and received beams of light and serves to direct the emitted beam of light towards the distant reflector and also for measuring the azimuth of the beam. Coupling means CM are shown schematically in the form of a rack connected to a displaceable member for varying the delay of delay device VD and engaging with rotatable member RM.

OPERATION OF FIG. 1 INSTRUMENT

The measurement of distance is conventional and comprises adjustment of phase network PN until a zero reading is obtained on null instrument NI. Delay device VD is then inoperative. The zero reading is obtained when the delay of network PN is equal to that of the signal from transmitter T to receiver R in well-known manner.

For measuring the azimuth angle, switching means SW is actuated to the position shown and delay device VD is inserted in the path of the beam of light, whereby the instrument is now adapted to measure the delay of delay device VD instead of the unknown distance. If rotatable member RM is moved from a reference direction through the angle required for directing the instrument towards the distant reflector, the angle is transferred by coupling means CM to delay device VD and is thus translated into a corresponding delay value and there is obtained a corresponding change in adjustment of phase network PN. This difference will be proportional to the angle through which rotatable member RM has moved.

FIG. 2 EMBODIMENT

FIG. 2 shows a modified embodiment, components of which corresponding to those of FIG. 1 have the same designations and modifications being indicated by primes.

Variable delay device VD' comprises a rotatable disc D, a detail view of which is shown in FIG. 3. Coupling means CM' is the axle of elevation of a tube TU for sighting the instrument on the distant reflector.

Provided on disc D are regularly spaced signal strips ST in the form of apertures for controlling the transmission of light paths LP having delays of 0°, 120° and 240° with respect to the signal of signal source S. The disc D comprises a corresponding number of sets S1-3 of signal strips ST, as shown in FIG. 3, the signal strips of the different sets having positions corresponding to 0°, 120° and 240° relative to the strip period, as shown. This is a known type of device for transforming displacement into a proportional phase shift and is described in U.S. Pat. application Ser. No. 810,549 now U.S. Pat. No. 3566140 (Swedish published Pat. No. 324,463).

Delay means DM' comprises units Pn and Ni, as in FIG. 1, and in addition, a counter C connected to null instrument NI and responsive thereto for counting the number of periods completed by null instrument NI when the phase difference between the transmitted and the received signal goes through a number of complete periods. This number of periods corresponds to the number of signal strips that pass in front of the light path LP.

OPERATION OF FIG. 2 INSTRUMENT

The operation is largely analogous to that of the FIG. 1 instrument. A rotation of disc D through an angle causes the received signal to be delayed through substantially one of the light paths after an integral number of strip periods through an angle between 0° and 360°. The integral number is the same as the number of periods of the signal strip sections that have passed in front of light paths LP. The integral value is counted by counter C and the angle between 0° and 360° is read off from phase network PN.

I claim:

1. An instrument for combined angular and distance measurement comprising:
    a transmitter for transmitting a signal over a distance to be measured,
    a receiver adapted to receive said signal with a delay dependent on said distance,
    delay means responsive to said transmitter and to said receiver signals for measuring said delay,
    a rotatable member, the angular position of which is to be measured,
    a variable delay device,
    switching means for inserting said variable delay device between said transmitter and said receiver (R), and
    coupling means connecting said rotatable member (RM) with said variable delay device for translating angular movement of said rotatable member into a proportional delay on said delay device.

2. An instrument as claimed in claim 1, in which said rotatable member is connected with a viewing system for angular orientation of said instrument.

3. An instrument as claimed in claim 1, in which said signal is a sinusoidal signal.

4. An instrument as claimed in claim 3, in which said delay means comprises an adjustable phase network coupled to said transmitter and a null instrument coupled to the outputs of said receiver and of said phase network.

5. An instrument as claimed in claim 1, in which said transmitter comprises a modulatable light emitter connected to the output of a modulator signal source.

6. An instrument as claimed in claim 5, in which said variable delay device comprises a light path of adjustable length.

7. An instrument as claimed in claim 5, in which said signal is a sinusoidal signal and said variable delay device comprises a rotatable disc having circumferential signal strips for controlling the phase of said receiver signal.

8. An instrument as claimed in claim 7, in which said signal strips comprise apertures inserted in a light path between said transmitter and said receiver.

9. An instrument as claimed in claim 8, in which said disc comprises a plurality of sets of apertures which are mutually displaced angularly with regard to said disc.

10. An instrument as claimed in claim 9, in which individual light paths of different lengths are provided for said sets of apertures.

* * * * *